UNITED STATES PATENT OFFICE.

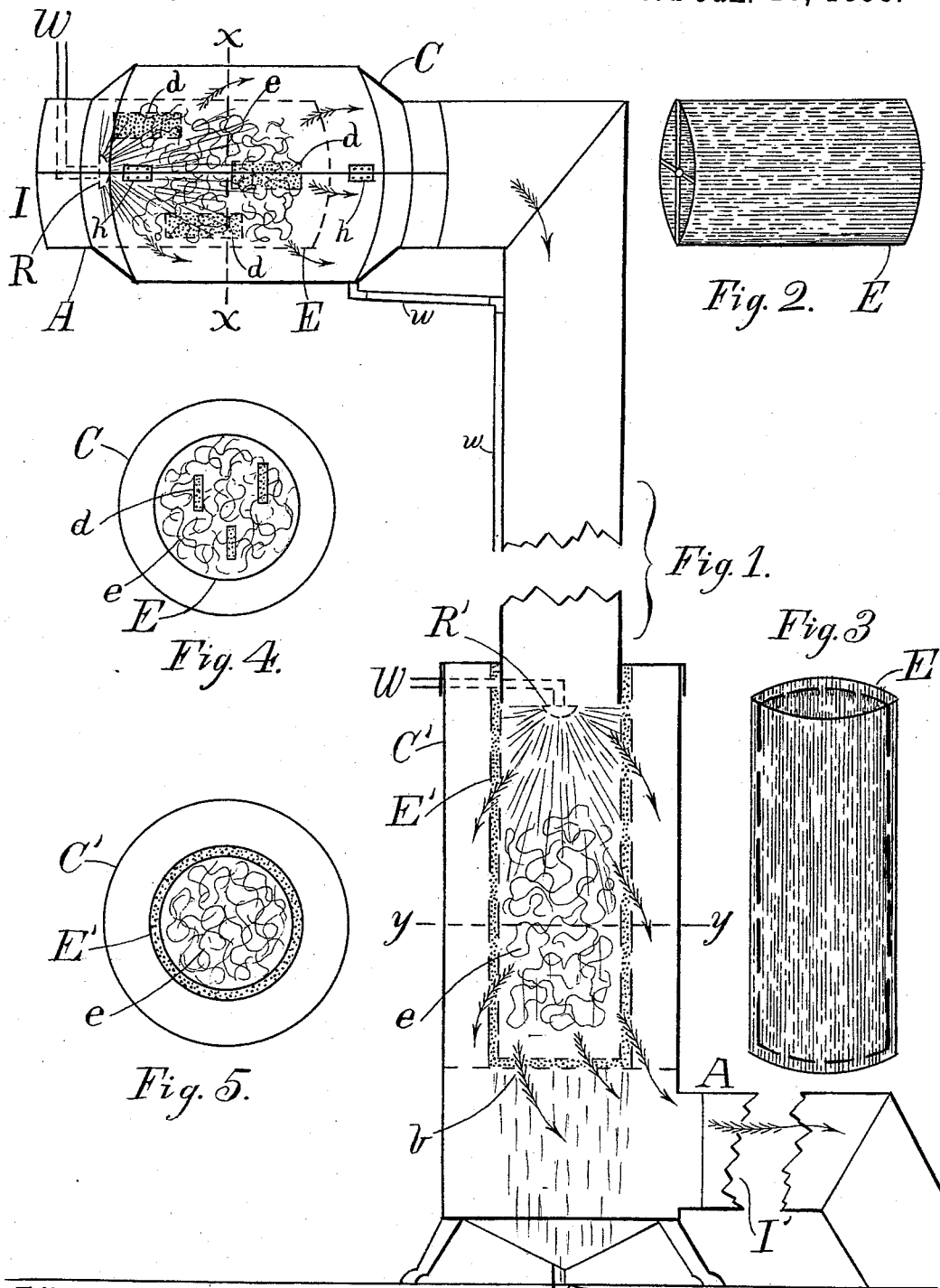

JEFFREY O. BENTLEY, OF PHILADELPHIA, PENNSYLVANIA.

AIR-FILTERING APPARATUS.

SPECIFICATION forming part of Letters Patent No. 489,450, dated January 10, 1893.

Application filed July 8, 1892. Serial No. 439,344. (No model.)

*To all whom it may concern:*

Be it known that I, JEFFREY O. BENTLEY, of the city of Philadelphia and State of Pennsylvania, have invented a certain new and useful Improvement in Air-Filtering Apparatus; and I do hereby declare the following to be a full, clear, and exact description thereof, reference being had to the accompanying drawings, forming part of this specification.

My invention has relation to air filtering apparatus for supplying pure air to buildings, as through the hot air flues of heaters, and consists in the devices hereinafter particularly described and claimed.

I will now describe my invention so that others skilled in the art to which it appertains may make and use the same, reference being had to the accompanying drawings forming part of the specification in which similar letters of reference refer to similar parts throughout.

Figure 1 is a partially sectional side elevation representing my complete apparatus, as in communication with a hot air furnace. Fig. 2 is a detached perspective view of the wire gauze cylinder forming part of the filtering device at the point of induction. Fig. 3 is a detached perspective view of the double wire gauze cylinder forming part of the preferable construction of the filtering device located at or near the point of eduction. Fig. 4 is a cross sectional view on the line $x$—$x$ of Fig. 1. Fig. 5 is a cross sectional view on the line $y$—$y$ of Fig. 1.

A represents an air flue constructed of metal, or other suitable material, connected at the point, I, with the outer air, as through a cellar window or casing, and at the point, I', with the air flues running through the building, as for instance with the hot air flues connected primarily with the hot air furnace. At or near the point, I, is provided in the flue A, an enlargement on metallic cylinder, C, preferably made in halves and hinged at $h$, to allow of access to the interior and filter provided therein. Within the casing, C, I provide a wire gauze cylinder, E, of a diameter preferably about equal to that of the flue, A, and connected to the flue, A, toward the point of induction, of a length slightly less than the length of the interior of the cylinder, C. Inside of the gauze cylinder, E, is preferably provided loosely disposed a quantity of filtering material as mineral wool, asbestus, animal or other charcoal, &c. secured and held in position therein by wire diaphragms or by a quantity of crinkled wire, $e$, impinging and binding against the inside of the gauze cylinder, E: I also preferably provide as a filtering medium a number of brick shaped gauze boxes, $d$, of wire filled with filtering material, such as asbestus, charcoal, &c. which gauze boxes are irregularly disposed among the crinkled wire, $e$, or other filtering material, and held in position thereby.

I also preferably provide in the flue, A, at or near the point of eduction a second filtering device in order to insure a perfect filtration of the air, as where it is particularly impure; this second filtering device may be of a construction substantially similar to that just described, though I preferably employ a double gauze cylinder, E', at this point with the interstice between the outer and the inner gauze cylinders filled with filtering material, such as charcoal, asbestus, &c., and provided with a bottom, $b$, filled in like manner with filtering material. The interior of the gauze cylinder, E', is also preferably provided with a filtering material substantially similar to that contained in the interior of the first cylinder, E, though I preferably eliminate the gauze blocks, $d$. The double gauze cylinder, E', is secured at its upper end to the flue, A, is preferably of about the same diameter and is suspended, as shown in Fig. 1, within the casing, C'. Around the gauze cylinder, E', I provide an enlargement or casing, C', which is closed at the bottom and also around the flue, A, at the top with a continuation of the flue, A, attached near the bottom.

At or near the outer end of the gauze cylinder, E, I provide a centrally located water jet or rose, R, and also a similarly located jet or rose, R', within the upper part of the gauze cylinder, E', each of these jets are connected with the water supply pipe, W, for the purpose of drenching the filtering material in the respective cylinders so that particles of water will adhere to the fibers of the filtering material and meshes of the wire forming thereon a thin film which has a tendency to aid the filtering material in catching and arresting particles of dust, and other impurities, contained in the air as the air passes through said filtering material, and as the jet continues to spray it carries away such particles of dust and impurities through the waste water pipes, $w, w'$, provided in the bottom of the casings, C, C', respectively, where the waste water accumulates.

It will thus be seen from the construction described that as the air enters at the point, I, and passes in the direction indicated by the arrows into the building through the flue, A, it necessarily first passes through the first filtering construction where the particles of dust and impurities are largely retained, and those particles which may escape the first filtering construction are arrested and carried off in the second, thus allowing the air to freely enter in flues through the building purified of all impurities.

I have described the preferable construction of filters though the detailed construction may be modified and the filters differently located without departing from the spirit of my invention. I preferably employ the two filters as described though the apparatus may be successfully operated with a single filter.

Having thus described my invention what I claim and desire to secure by Letters Patent, is:—

In an air filtering apparatus in combination with an induction and eduction air flue an enlarged casing connected with the induction and eduction flue, a wire gauze cylinder closed at one end provided in said casing connected with the induction flue having an interior area in cross-section about equal to the interior area in cross section of the induction flue, filtering material provided in said gauze cylinder and a water jet or spray provided at the entrance of the gauze cylinder and waste water pipe provided at the lower end of the enlarged casing substantially as described.

In witness whereof I have hereunto set my hand this 29th day of June, A. D. 1892.

JEFFREY O. BENTLEY.

Witnesses:
 JOS I. SCULL,
 JEREMIAH KERINS.